(12) United States Patent
Beadle

(10) Patent No.: US 7,447,276 B1
(45) Date of Patent: Nov. 4, 2008

(54) RECEIVER AND METHOD FOR BLIND ADAPTIVE THRESHOLDING USING NOISE ESTIMATOR

(75) Inventor: Edward R. Beadle, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/846,616

(22) Filed: Aug. 29, 2007

(51) Int. Cl.
- H04L 27/00 (2006.01)
- H04L 25/08 (2006.01)
- H04L 1/02 (2006.01)

(52) U.S. Cl. .......................... 375/316; 375/346; 375/347

(58) Field of Classification Search .................. 375/316, 375/346, 285, 347, 260; 455/132
See application file for complete search history.

(56) References Cited

U.S. PATENT DOCUMENTS

| | | | | |
|---|---|---|---|---|
| 5,262,789 | A * | 11/1993 | Silverstein | 342/368 |
| 6,240,098 | B1 * | 5/2001 | Thibault et al. | 370/431 |
| 6,567,462 | B1 | 5/2003 | Brunner et al. | 375/148 |
| 6,711,528 | B2 | 3/2004 | Dishman et al. | 702/189 |
| 6,993,460 | B2 | 1/2006 | Beadle et al. | 702/196 |
| 7,062,277 | B2 | 6/2006 | Rudowicz | 455/452.1 |
| 7,076,001 | B2 | 7/2006 | Beadle et al. | 375/316 |
| 7,184,457 | B2 * | 2/2007 | Schmidl et al. | 375/130 |
| 7,187,326 | B2 | 3/2007 | Beadle et al. | 342/451 |
| 7,263,208 | B1 * | 8/2007 | Crosby et al. | 382/103 |
| 2006/0269017 | A1 | 11/2006 | Beadle et al. | 375/343 |
| 2006/0269027 | A1 | 11/2006 | Beadle et al. | 375/354 |

OTHER PUBLICATIONS

Chang et al., "*A Matrix-Pencil Approach to Blind Separation of Colored Nonstationary Signals*," IEEE Transactions on Signal Processing, vol. 48, No. 3, Mar. 2000, pp. 900-907.

Parra et al., "*Blind Source Separation via Generalized Eigenvalue Decomposition*," Journal of Machine Learning Research 4 (2003), pp. 1261-1269.

Steven M. Kay, Modern Spectral Estimation: Theory and Application, Prentice Hall, Jan. 1988, Section 13.9—Noise Subspace Frequency Estimation, pp. 429-431.

Dan et al., "*On the Blind SNR Estimation for IF Signals*," Proceedings of the First International Conference on Innovative Computing, Information and Control, IEEE, 2006, 4 pages.

Pauluzzi et al., "*A Comparison of SNR Estimation Techniques for the AWGN Channel*," IEEE Transactions on Communications, vol. 48, No. 10, Oct. 2000, pp. 1681-1691.

(Continued)

*Primary Examiner*—Tesfaldet Bocure
(74) *Attorney, Agent, or Firm*—Allen, Dyer, Doppelt, Milbrath & Gilchrist, P.A.

(57) ABSTRACT

A receiver estimates noise power and establishes a false alarm detector threshold. The receiver includes an antenna array having a plurality of antenna subarrays on which multiple communications signals are received over a communications channel. At least one channelizer splits the communications signal into multiple frequency sub-bands per subarray, each having a channel output. At least one noise estimator and detector is operative at the channel outputs for estimating noise power and setting a detector threshold used in detecting false alarms by forming a temporal covariance matrix on each channel output, performing an eigenvalue decomposition on the temporal covariance matrix, selecting candidate channels using the eigenvalue spread per channel, computing a noise power estimate from the candidate channels and setting a detector threshold for detecting false alarms based on the noise power estimate.

22 Claims, 6 Drawing Sheets

OTHER PUBLICATIONS

Lee et al., "*Joint Estimation of the Space-Time Distributed Signal Parameters,*" IEEE, Vehicular Technology Conference (VTC) 2000, pp. 822-828.

Benedict et al., "*The Joint Estimation of Signal and Noise from the Sum Envelope,*" IEEE Transactions on Information Theory, vol. IT-13, No. 3, Jul. 1967, pp. 477-454.

Beaulieu et al., "*Comparison of Four SNR Estimators for QPSK Modulations,*" IEEE Communications Letters, vol. 4, No. 2, Feb. 2000, pp. 43-45.

Celandroni et al., "*Quality Estimation of PSK Modulated Signals,*" IEEE Communications Magazine, Jul. 1997, pp. 50-55.

Matzner, "*An SNR Estimation Algorithm for Complex Baseband Signals Using Higher Order Statistics,*" Electronics and Energetics, vol. 6, No. 1, 1993, pp. 41-52.

\* cited by examiner $$R = \begin{bmatrix} E\{x^H x\} & E\{x^H x_d\} \\ E\{x_d x^H\} & E\{x_d^H x_d\} \end{bmatrix} = \frac{1}{N} \begin{bmatrix} \sum_{n=0}^{N-1} x^*[n]x[n] & \sum_{n=0}^{N-1} x^*[n]x[n-d] \\ \sum_{n=0}^{N-1} x[n]x^*[n-d] & \sum_{n=0}^{N-1} x[n-d]x^*[n-d] \end{bmatrix} = \begin{bmatrix} \hat{r}(0) & \hat{r}(d) \\ \hat{r}^*(d) & \hat{r}(0) \end{bmatrix}$$

$$\lambda_{min} = \lambda_{noise} = \hat{r}(0) - \|\hat{r}(d)\| = \hat{P}_{noise}$$

$$\lambda_{max} = \lambda_{sig+noise} = \hat{r}(0) + \|\hat{r}(d)\|$$

FIG. 2

RECEIVER AND METHOD FOR BLIND ADAPTIVE THRESHOLDING USING NOISE ESTIMATOR

FIELD OF THE INVENTION

This invention relates to communications, and more particularly, this invention relates to blindly setting adaptive thresholds for signal detection in a possibly multi-signal environment.

BACKGROUND OF THE INVENTION

Sophisticated communications use systems that are directed towards the blind and adaptive establishment of thresholds for signal detection. More specifically the thresholds are derived "blindly". As is typical of blind signal processing the receiving system only has access to the channel outputs, and no knowledge or information regarding the environment being sensed. Blind processing has well known advantages, in particular when the transmission system may be non-cooperative or autonomous with respect to the reception system. The advantages also present challenges.

For example one key challenge for a signal detection system operating blindly is to set a signal detection threshold. Normally this is performed using a sequence of known noise-only samples to estimate noise power and hence derive a threshold suitable to meet a desired probability of false alarm ($P_{fa}$). In many blind systems, no such labeling of the received data is possible. Hence the signal detection system is operative to set a threshold in the presence of signal components. There are many uses for such a threshold, and those skilled in the art will recognize the value of such a system capability.

The system disclosed herein is operative to adaptively set signal detection thresholds to meet a Pfa requirement. Adaptation is achieved by repeating the noise estimation processing on some scheduled interval. In each interval, for each channel, the noise estimates are generated from correlation matrices developed using data sampled from the receive channel(s). The adaptation feature is particularly useful when the environment may have non-stationary noise and changing co-channel signal environment.

In addition, the system has the novel capability to indicate a quality metric which indicates the potential level of bias or contamination in the noise estimates by signal components. Based on the quality metric the noise estimate can be rejected as "unusable" depending on the needs of a particular application.

SUMMARY OF THE INVENTION

In accordance with a non-limiting example of the present invention blind adaptive thresholding to support reliable signal detection is accomplished. The invention is also operative to generate a quality metric, which provides an indication for potential bias in the noise estimate used to derive a threshold. The bias is caused by energy from a signal co-channel in the data used to generate the noise estimate. Excessive bias could mean that the estimate is possibly unusable in a particular application. It is up to the designer for a particular application to determine the limit of acceptable bias.

In accordance with a non-limiting example, a system is disclosed that blindly and adaptively estimates the background noise power of a polarization-frequency diverse signal environment and establishes a threshold per selected polarization-frequency band of operation operative to meet a predefined probability of false alarm requirement is disclosed. The system is operative in a blind mode since it operates without requiring labeling of collected data as containing noise-only. The system is adaptive since the estimation process is carried out on temporally recurring basis under control of a rule decided by the system designer.

The system includes an antenna array that potentially has a plurality of antenna subarrays on which multiple communications signals are received and channelized. The antenna design is suitable to the frequency band and signal character desired to be received. At least one channelizer for splitting the signals into multiple polarization-frequency sub-bands per subarray, each having a channel output is used. At least one noise estimator is operative, and outputs an estimated noise power for an operating band. The noise power is then operative to set a detector threshold using well known formulations and application dependent integrals for probability of false alarm.

Using pre-selected (e.g. specified by the system user/implementer) polarization-frequency channels, a possible plurality (i.e. one estimate per channel), channel dependent noise estimates are derived using a simplified eigenvalue decomposition of a 2×2 correlation matrix formed for each of the selected polarization-frequency bands.

Under decision of the system user/designer, the individual polarization-frequency channel noise estimates may be pooled to provide an improved system-level estimate. In this case, the plurality of channels contributing to the pool will be assigned the same detection threshold. This would be advantageous when the noise is considered to have common properties across all the polarization-frequency channels.

For each channel processed for noise estimation, a ratio test on a set of eigenvalues is performed. The eigenvalues are generated by decomposing the correlation matrices formed for each selected channel. Only those channels passing the ratio test are accepted as valid noise estimates.

To derive the eignevalues, a greatly simplified version of an eigenvalue decomposition of the temporal correlation matrix is used.

One novelty of the system disclosed is that a simplified eigen structure suitable for direct hardware implementation is disclosed. A second novelty disclosed is the ability to compute a quality metric for determining "overly" contaminated channels. A third novelty is the processing is performed in a blind adaptive mode in the presence of potentially contaminating signals.

BRIEF DESCRIPTION OF THE DRAWINGS

Other objects, features and advantages of the present invention will become apparent from the detailed description of the invention which follows, when considered in light of the accompanying drawings in which.

FIG. 2 illustrates some of the mathematics used to update the noise estimate according to a moving average (or update rule) for blind adaptive thresholding to measure noise level and set detection thresholds to indicate "contaminated" measurements regardless of noise level.

DETAILED DESCRIPTION OF THE PREFERRED EMBODIMENTS

Figure 1:
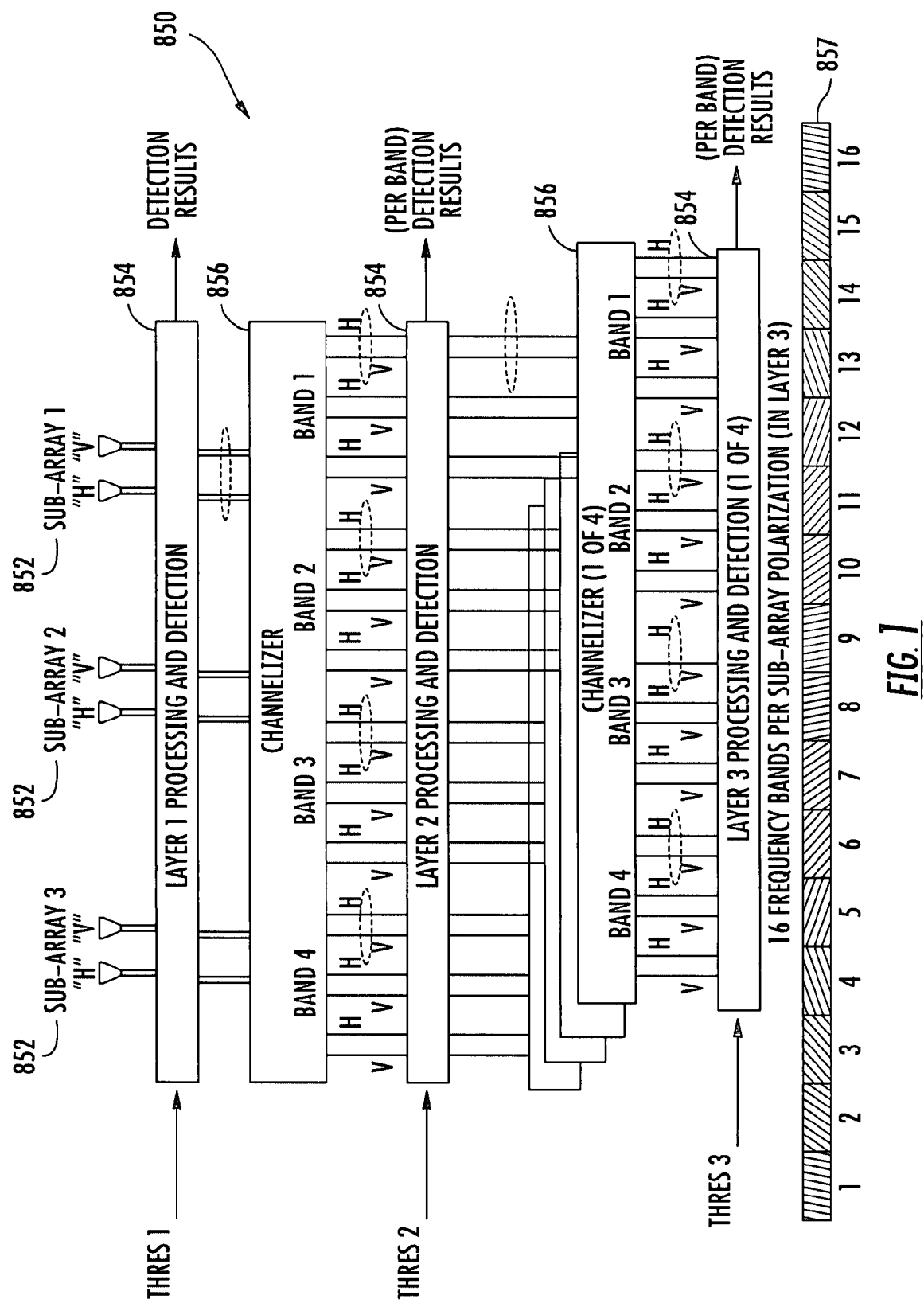
FIG. 1 is block diagram showing three antenna sub-arrays and three different processing and detection layers and associated channelizers with various thresholds for blind adaptive thresholding in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited to any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWE), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In accordance with a non-limiting example of the present invention, blind adaptive thresholding is accomplished with a quality indicator to determine how well the communication channel is operating and explain any noise constituents as determined by the noise power estimator described above. The system is typically limited to a 2×2 channel (i.e. meaning that a correlation matrix of 2×2 dimension is sufficient for processing objectives) and processing for the blind adaptive thresholding can be accomplished without any dedicated digital signal processor or microprocessor by using a specific sequence of operations explained below.

The system and method provides for blind adaptive thresholding and a quality indicator within a receiver. The system is operative with an array and channelizer, and exploits the noise construct from the blind noise estimator explained above, but limits any correlation to a 2×2 per space-frequency, polarized channel, uses the system in one embodiment a specialized Eigenvalue decomposition per channel. The vector channel is space-frequency and multi-signal. The system uses individual knowledge of the signal and noise to set the detection threshold, without knowing the modulation. Prior art techniques typically required knowledge of the signal type.

The system and method in one non-limiting example measures the noise level using the noise estimator and process as explained above and sets a detection threshold and indicates "contaminated" measurements regardless of noise level. As a result, the system and method detects "white" space, for example, advantageous for a "clear-to-send" applications.

FIG. 1 is a block diagram of a portion of a receiver 850 showing three subarrays 852 and three different processing and detection layers 854 identified as layers 1, 2 and 3 and two channelizers 856, each operative in different communications bands as illustrated and identified as Bands 1-4. Sixteen frequency bands 857 are illustrated per subarray polarization such as in layer 3. The layers may be used to refine frequency estimates of spectral components in that refined channelization are possible, as is well known in the art. The processing disclosed herein is applicable to any layer where at most one (non-noise) signal is assumed to occupy the polarization-frequency band.

The detection thresholds are adaptively set to meet the probability of detection (Pd) and probability of false alarm (Pfa) requirements in the presence of an unknown, non-stationary noise and in a co-channel signal environment. It is possible to detect "white space" in time-frequency slots in the unknown, non-stationary noise and co-channel signal environment. Each processing and detection layer receives a threshold with various detection results output from the processing and detection layer per band at layers 2 and 3. Thus, the threshold is set at each level and each array is horizontally and vertically sensitive. Each level has a channelization and four bands are illustrated, each equal in size. It should be understood that each band does not have to be equal in size, but for purposes of illustration and typically in the communications environment, they are equal.

As an example, at each output there could be a 100 MHz wide signal with each band about 25 MHz. Thresholds can be set appropriately to determine when nothing occurs. Each band can be processed and detected individually.

FIG. 2 shows an example of the calculations used for the 16 frequency bands per subarray polarization. The system is operative as an auto correlation matrix and, in each channel, there typically is at most one signal During the collection timeline allocated to training, it is possible to use all 16 polarization-frequency sub-bands on one subarray. Sixteen sub-bands can be selected to cover the entire frequency range and maximize the probability of finding a good noise estimate. One subarray could be selected because subarrays are assumed identical. An alternative is to distribute the 16 channel estimators across the subarray at one per band. All subarrays should sense the same signal content in a given band, but the, hardware limitations may cause the sensed values to be non-identical. Well known and application dependent methods are available to address such situations.

Each selected channel output forms an 2×2 (N×N) temporal covariance matrix R as shown below. This implies at most 1 (N−1) signal co-channel with the data for the noise estimator is allowable. Also, as shown below a unit element delay is preferably in the correlations to aid in the algorithm. This selection provides maximum utility and protection against signal decorrelation. Decorrelated signals may be confused by the algorithm as white noise components and hence be undetected as contamination.

The processing system performs an "Eigen-less" eigenvalue decomposition on the temporal covariance matrix and the Eigenvalue spread per channel is used to select "candidate" channels for the estimate. A key here is that the typical eigenvalue computation is simplified (e.g. "Eigen-less") to a scalar quadratic equation because of the limitation to a 2×2 matrix. The roots of such a second-order algebraic equation are well-known as functions of the equation co-efficient. In this case the equation co-efficient are actually elements of the correlation matrix and can be read by inspection which greatly simplifies hardware design.

Once the Eigenvalues from the candidate channels are determined, they can be pooled together to compute a system-level noise estimate or the individual results can be applied to their respective channels. Assuming a pool of values if formed a number of processing options exist such as selecting the minimum value of all candidate channels, averaging the minimum eigenvalues, selecting the median eigenvalue as well as many others. The goal of such a pool is to improve the individual channel estimates and reject the influence of statistical fluctuations in an individual channel which can negatively impact threshold setting. These different metrics having their pros and cons.

Figure 6:
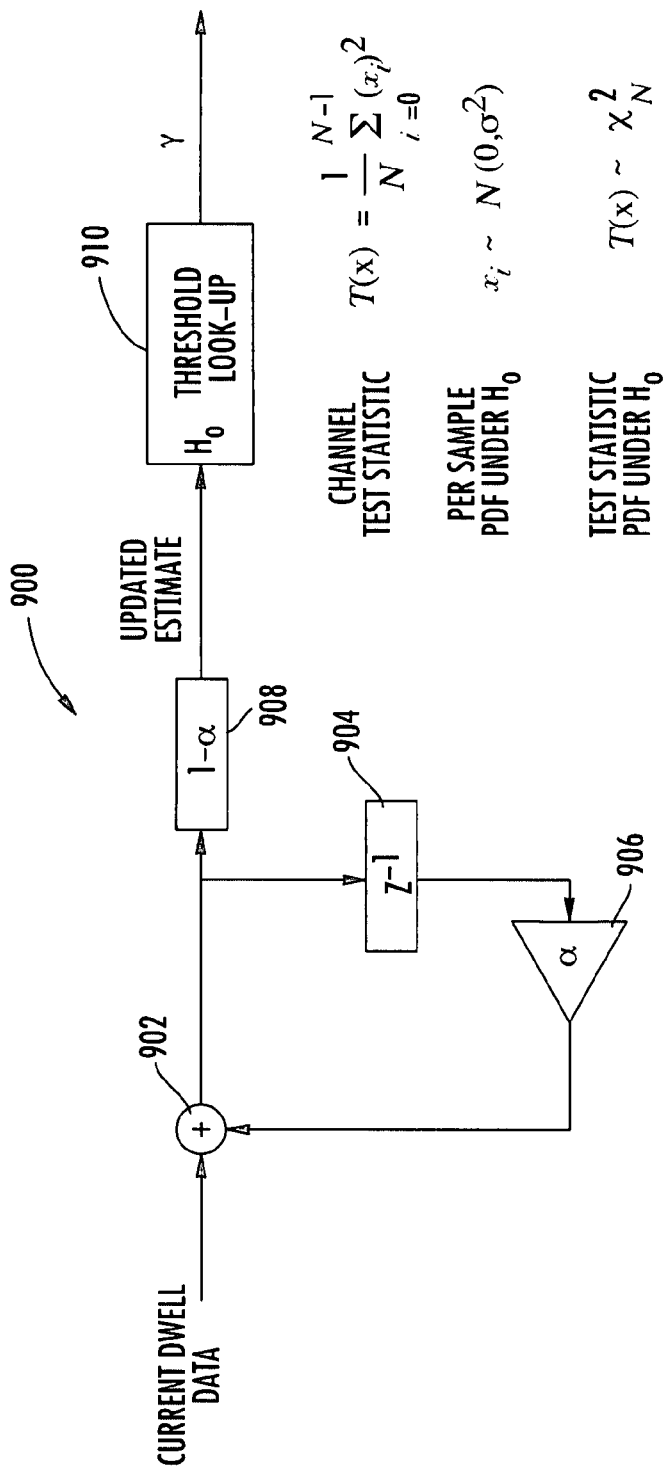
FIG. 6 is a block diagram of a low-pass filter that is operative with the noise estimator for obtaining an updated estimate and establishing a threshold look-up.

As mentioned earlier, all the noise estimates in the system could be updated as a moving average using the low-pass filter and associated structure as shown in FIG. 6.

There now follows a more detailed explanation of the mathematics used for the Eigen-less decomposition.

In the classic eigenvalue approach one computes the solution to $\det(\lambda I - R) = 0$, I is a 2×2 identity matrix, the resulting computation is as shown below:

$$\boxed{\text{Classic Eigenvalue Approach}} \det\begin{bmatrix} \lambda - \hat{r}(0) & \hat{r}^*(1) \\ \hat{r}(1) & \lambda - \hat{r}(0) \end{bmatrix} = 0 \Rightarrow [\lambda - \hat{r}(0)]^2 - \|\hat{r}(1)\|^2 = 0$$

The elements of the correlation matrix R are shown "schematically" as $\hat{r}(0)$ and $\hat{r}(1)$. The argument of the function indicates the relative lag in used in computing the correlation (i.e. no lag or a 1 data sample lag). The above equation can be expressed as a standard quadratic equation with roots shown below:

$$\boxed{\text{Re-Express Matrix Operation}} \underbrace{1}_{a}\lambda^2 - \underbrace{2\hat{r}(0)}_{b}\lambda + \underbrace{\hat{r}^2(0) - \|\hat{r}(1)\|^2}_{c} = 0$$

$$\boxed{\text{Exploit } 2\times 2 \text{ Yielding Quadratic Function}}$$

$$\lambda = \frac{+2\hat{r}(0) \pm \sqrt{4\hat{r}^2(0) - 4(\hat{r}(0) - \|\hat{r}(1)\|^2)}}{2} =$$

$$\hat{r}(0) \pm \|\hat{r}(1)\| = \begin{cases} R_{SS}(0) + R_{NN}(0) - R_{SS}(1) - R_{NN}(1) \\ R_{SS}(0) + R_{NN}(0) + R_{SS}(1) + R_{NN}(1) \end{cases}$$

The roots are the eigenvalues of the matrix, and as is well-known in array-processing techniques the smallest eigen value of the correlation matrix corresponds to noise-only power. Because the data samples may contain at most one signal in addition to the noise the correlation samples may be more explicitly written as:

$$\hat{r}(0) = R_{SS}(0) + R_{NN}(0) \text{ and } \hat{r}(1) = R_{SS}(1) + R_{NN}(1)$$

Under the reasonable assumption the in a given frequency channel the signal and noise are uncorrelated. Further we assume, in this case for presentation, that the noise is white implying $R_{NN}(1) = 0$. In the above equation, and throughout, $R_{SS}$ and $R_{NN}$ are the autocorrelations of the signal and noise respectively.

Then we introduce the correlation factor as shown below:

Introduce correlation factor $\beta$—where $\beta = \|R_{SS}(1)\|/R_{SS}(0) \in [0,1]$ Then the noise estimate per channel can be expressed as:

$$\boxed{\text{Noise Estimate Solution is Measured Element of Matrix}}$$

$$R_{ss}(0) + R_{nn}(0) - R_{ss}(1) - R_{nn}(1) =$$

$$R_{ss}(0) + R_{nn}(0) - \|R_{ss}(1)\| = R_{ss}(0)(1-\beta) + R_{nn}(0) \approx R_{nn}(0) = \sigma_n^2$$

The noise estimate based on these parameters is based on the (signal) correlation factor $\beta$ ideally being (near) unity. To determine the quality of the noise estimate the ratio of the two eigenvalues are computed as shown below:

$$\boxed{\text{Quality Metric "Blindly" Generated from Measured Data}}$$

-continued $$\Gamma = \frac{\lambda_{max}}{\lambda_{min}} = \frac{R_{ss}(0)(1+\beta) + R_{nn}(0)}{R_{ss}(0)(1-\beta) + R_{nn}(0)} > 1$$
(signal present)

$$\Gamma = \frac{\lambda_{max}}{\lambda_{min}} = \frac{\cancel{R_{ss}(0)}(1+\beta) + R_{nn}(0)}{\cancel{R_{ss}(0)}(1-\beta) + R_{nn}(0)} = 1$$
(signal absent)

The LHS indicates that when a signal is present in the polarization-frequency band the quality metric exceeds unity (in expectation). The RHS illustrates that when the polarization-frequency channel has only noise then the quality metric is ideally unity.

In practice, $\beta$ will be non-unity due imperfect signal correlation. Therefore two boundary cases are of interest. First if the signal is present but of very low power (e.g. the low SNR case) as illustrated below. Then the quality metric approaches unity (from above) as SNR decreases. Since SNR has decreased this is similar in character to a noise-only channel. On the other hand, if the signal has high SNR then the metric is significantly above unity. And this indicates the minimum eigenvalue is still significantly biased by signal and should be rejected as useful.

But what if the signal is NOT absent and decorrelates "quickly"?

$$\Gamma = \frac{\lambda_{max}}{\lambda_{min}} = \frac{R_{ss}(0)(1+\beta) + R_{nn}(0)}{R_{ss}(0)(1-\beta) + R_{nn}(0)} \approx \frac{SNR(1+\beta)+1}{SNR(1-\beta)+1}$$

Noise Estimate $$R_{ss}(0)(1-\beta) + R_{nn}(0) = \hat{\sigma}_n^2$$

Ex: $\beta = 0.5$, "high" SNR $$\Gamma = \frac{(1+\beta)}{(1-\beta)} = \frac{1.5}{0.5} = 3$$

Ex: $\beta = 0.5$, "low" SNR $$\Gamma = \frac{\varepsilon(1+\beta)+1}{\varepsilon(1-\beta)+1} \Rightarrow 1$$

Figure 3A:
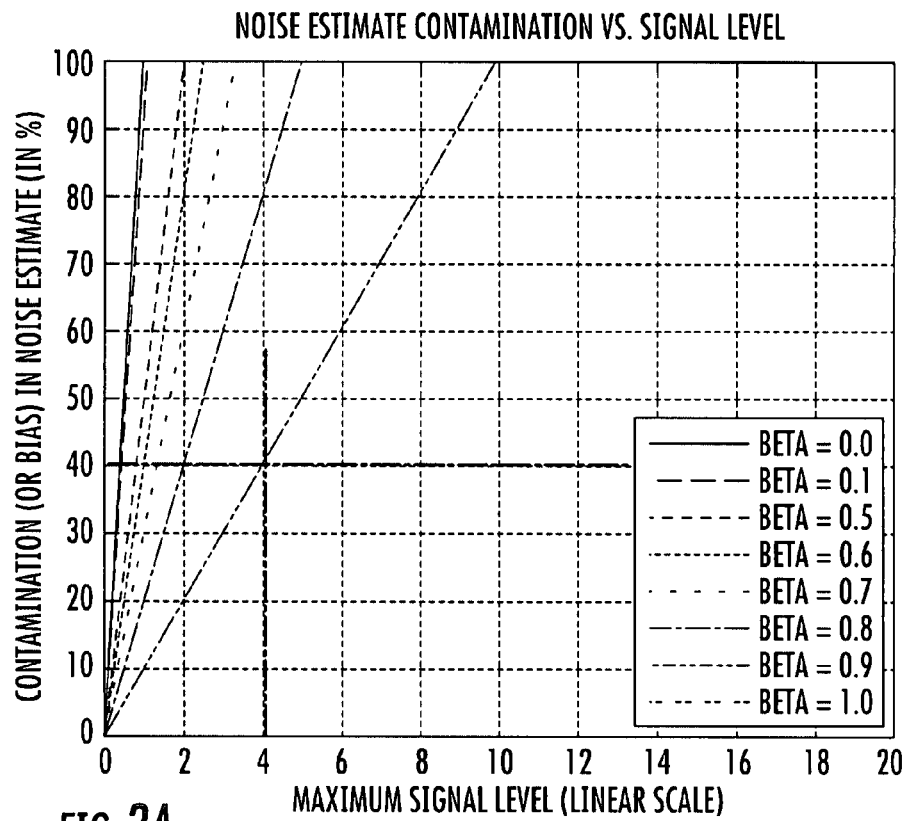
FIGS. 3A, 3B, 4A and 4B are graphs showing a noise estimate application at a maximum signal level and showing the rejection region and accept region in respective FIGS. 3B and 4B.
Figure 3B:
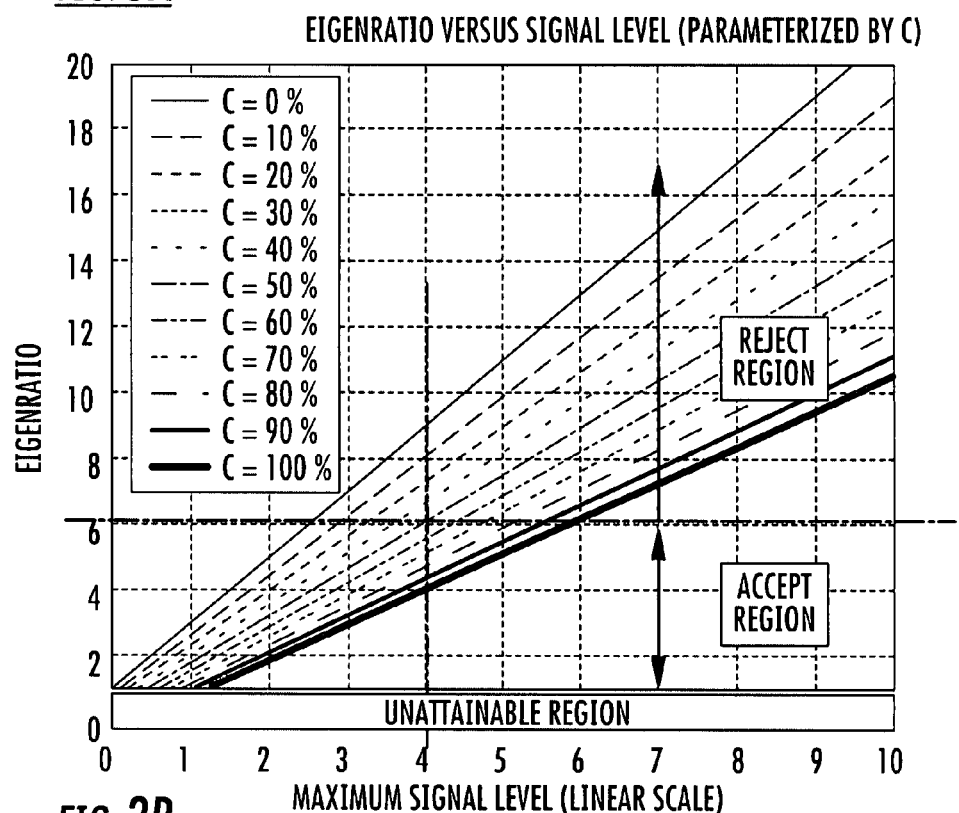

The charts shown in FIGS. 3A and 3B are used to operate the system. An overview is presented here. FIG. 3A illustrates the percentage bias in the noise level versus maximum signal level parameterized by $\beta$. The $\beta$ is varied from unity (no decorrelation) to zero (complete decorrelation) for adjacent samples. Note that $\beta$ is indexed on the curves to decrease from bottom to top, and there is one special case not obvious from the graph. The case of perfect correlation ($\beta=1$) never induces bias and is a horizontal line on C=0.

To use this graph, a user would estimate the minimum correlation factor expected, and then given maximum contaminating signal power level desired, the percent bias or contamination (C) is determined. This value is read off the curves as the intersection of the selected $\beta$ curve and vertical maximum signal level line.

Using the C value, the curves in FIG. 3B are consulted. These curves illustrate the eigenratio versus maximum signal level parameterized by C. Note that the curves are defined with the contamination ratio increasing from bottom to top. To index into the curves, one uses a vertical line at the maximum signal level, and where it intersects the "C defined" curve the eigen ratio is "read-off". This ratio is the value used to reject a channel as contaminated. Note that three regions are delineated in the example FIG. 3B. The unattainable region is because the eigen ratio, even under ideal cases cannot be less than unity. The accept region means that any channel with an eigenratio of less than the prescribed amount (from the curves) is sufficient to estimate noise. The reject region means that there is more contamination than desired for a useable estimate.

There now follows a numerical sample result. Set-up occurs with 3 dB SNR, unit noise power, 10,000 sample data record for 1,000 "symbols". 10,000 samples are collected. For example, at 50 MHz this is 200 microseconds. The symbol is a 10× sample duration with beta=0.9. The test signal has a frequency=0.2 (normalized to the sample frequency), a random angle of arrival (AoA), and a random BPSK (un-shaped) information stream.

When the signal is present a possible example result can occur as described below. Using some of the above equations for the eigenvalues, the estimated channel noise value (i.e. the minimum value) is 1.31 (3*0.9+1=1.27), which could be a true value. The estimated maximum Eigenvalue is 6.72 (3*(1+0.9)+1.00=6.70). The Eigenratio is about 5.13. The system, under this example, rejects the channel noise estimate as "contaminated" because the signal poisons the noise estimate (or indicates that the channel is occupied). A ratio of about 4 for 3 dB yields a 20% contamination, which is deemed acceptable for the noise estimation example under consideration. In practice each application must be decided on its own merits.

Continuing the example, when the signal is absent a possible example result occurs as now set forth. The Eigenvalues are 0.9784 and 1.0053. The Eigenratio is now 1.027. The noise power estimate is 0.9918 (1=ideal estimate). The noise estimate is accepted or, in the case of say a "occupancy detector" the channel "clear to send" flag is set.

Figures 4A, 4B:
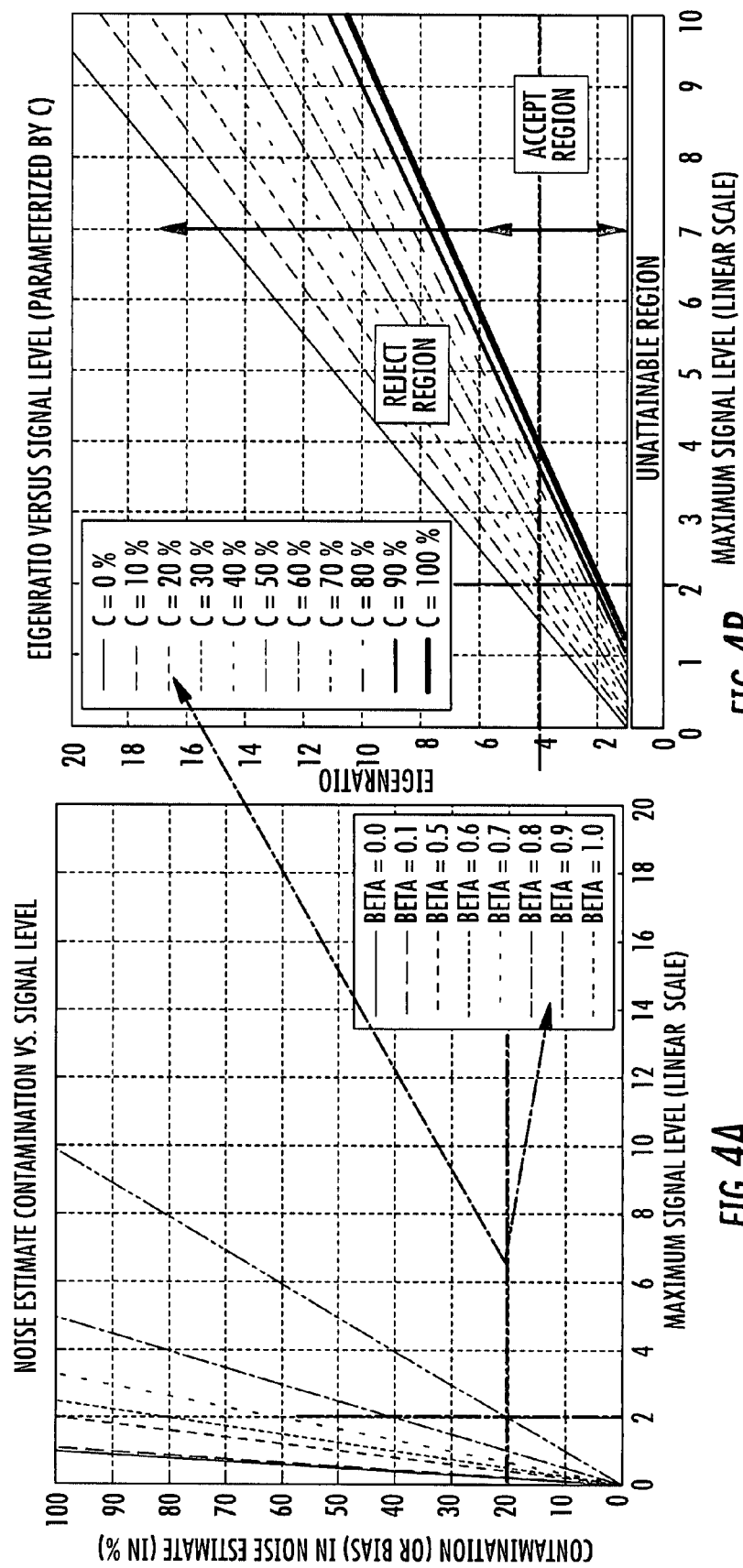

To further illustrate the use of the curves shown in FIGS. 3A and 3B, the example above is continued with reference to the curves in FIGS. 4A and 4B. These curves are exactly the same as those explained previously as FIGS. 3A and 3B. Overlaid on the figures are the parameters for the current example in that the P=0.9 and using a 3 dB SNR (where the noise level is assumed at unit power, maximum signal level of 2 on a linear scale). As part of the example only a 20% contamination was deemed "acceptable", which when consulting the curves in FIG. 4B yields and eigenratio of target of 4. In the signal present case, it was illustrate that the eigenratio exceeded 4 and in the signal absent case the eigenratio remained much below 4.

It may also be apparent that the system would be very useful, if the noise estimates and resulting thresholds so computed, were to adapt to changing signal or noise conditions. This is simply accomplished by blocking sets of collected data and subsequently processing each block as noted above. In current terminology we call the data collected for noise estimation a training block or set. As such it is conceivable that a particular trained value may temporally persist for a longer time than needed to collect the next set of training values. The timeliness of collection and application of training data is unique to individual applications.

Figure 5:
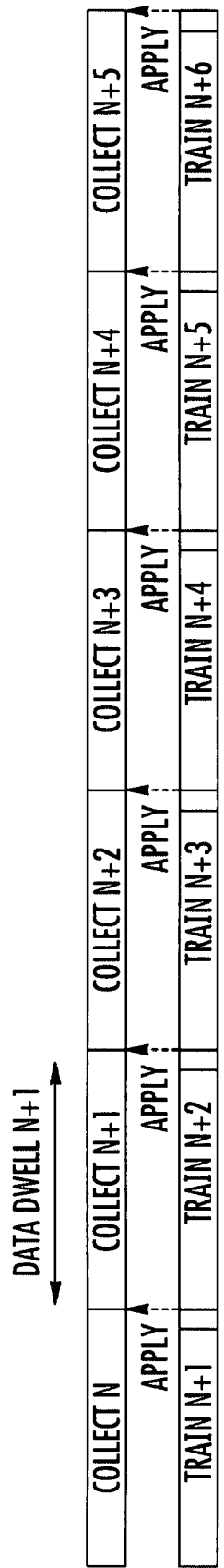
FIG. 5 is a diagrammatic time chart showing an example how feed forward training could be applied in a noise estimator.

FIG. 5 shows a non-limiting example of timetable for feed forward training (i.e. training data is collected before the application of a result) using a data dwell and then applying the result to the next block of collected data. Data is collected and training applied as illustrated. A latency as small as one dwell between training and application could be used, or most any other training scheme deemed appropriate could be used. Also further, the training does not have to be performed on every opportunity and many application specific rules for when to re-train are possible. The key element is that the system provides the mechanism to do so as desired.

The system also makes a provision for altering the noise estimates. The pooled or individual estimates are passed to the preferred embodiment shown in FIG. 6. The structure is a low-pass filter that applies an update (update rule) to the noise estimator to produce an updated estimate. An example circuit is shown in FIG. 6. The filter 900 receives the most current dwell data within a summer 902. Appropriate feedback occurs through a delay circuit 904 and an amplifier 906. Part of the signal that is not fed back to the summer 902 is passed through a noise subtraction circuit 908 and as an updated estimate to a threshold look-up 910. The example calculations show the filter set to unity gain. If 0, the filter does not remember and there is no feedback. If it approaches 1, the filter does not forget and there is infinite memory. Thus the value $\alpha$ can be used to control the memory of the previous values. There are many other variations of possible update schemes. Again the key factor is that the system can accommodate a time-varying noise estimate.

The actual detection threshold based on the updated (and possibly pooled) noise estimate is derived from solving the integral for Pfa. What is required to solve for the threshold $\gamma$ is the density function of noise under the signal absent hypothesis (often termed Ho or the null hypothesis) and the noise estimate. Techniques to solve this equation are well known to those skilled in the art and the exact form depends on the prevailing modeling and assumptions for a given problem.

The system and method, in accordance with a non-limiting example of the present invention, provides a blind background "noise" estimate even in a non-stationary, co-channel environment. The signal in the each channel can be unknown and of time varying character. The detector threshold based on the noise estimate is typically adaptive and follows a non-stationary or background noise environment.

The system can add to the legacy of advanced array signal processing for mobile and fixed ad-hoc networks in multiple narrow channels. It supports automatic link establishment (ALE) with optimal routing via in-service link quality measurements, for example, clear versus occupied channels. It is operative with adaptive modulation systems and provides continual background noise estimates to select optimal modulation. The noise estimate is blind to the signal type. The system is also operative with adaptive coding systems. The noise background provides information on a channel coding rate required to achieve the desired bit error rate (BER) and quality of service (QOS).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A receiver for estimating noise power and establishing a false alarm detector threshold, comprising:
    an antenna array comprising a plurality of antenna subarrays on which multiple communications signals are received over a communications channel;
    at least one channelizer for splitting the communications signal into multiple frequency sub-bands per subarray, each having a channel output; and
    at least one noise estimator and detector operative at said channel outputs for estimating noise power and setting a detector threshold used in detecting false alarms by forming a temporal covariance matrix on each channel output, performing an eigenvalue decomposition on the temporal covariance matrix, selecting candidate channels using the eigenvalue spread per channel, computing a noise power estimate from the candidate channels and setting a detector threshold for detecting false alarms based on the noise power estimate.

2. The receiver according to claim 1, wherein said at least one noise estimator and detector is operative for estimating noise on a 2×2 per space-frequency-polarized channel.

3. The receiver according to claim 1, and further comprising a Constant False Alarm Rate (CFAR) detector that detects and filters false alarms based on the detector threshold.

4. The receiver according to claim 1, wherein one subarray is selected for estimating noise.

5. The receiver according to claim 1, wherein each channel output includes a noise estimator and detector.

6. The receiver according to claim 1, wherein at least one noise estimator and detector is distributed at each frequency sub-band.

7. The receiver according to claim 1, and further comprising a plurality of processing and detection layers having at least one noise estimator and detector for scaling a noise level by bandwidth ratios.

8. The receiver according to claim 1, wherein said at least one noise estimator and detector is operative for decomposing a correlation matrix without an eigenvalue computation using quadratic factoring results.

9. The receiver according to claim 1, wherein at least one noise estimator and detector is operative for pooling candidate channels.

10. A receiver for estimating noise power and establishing a false alarm detector threshold, comprising:
    an antenna array comprising a plurality of antenna subarrays on which multiple communications signals are received over a communications channel;
    at least one channelizer for splitting the communications signal into multiple frequency sub-bands per subarray, each having a channel output; and
    at least one noise estimator and detector operative at said channel outputs for estimating noise power and setting a detector threshold used for detecting false alarms by forming a temporal covariance matrix on each channel output, performing an eigenvalue decomposition on the temporal covariance matrix, selecting candidate channels using the eigenvalue spread per channel, computing a noise power estimate from the candidate channels and setting a detector threshold for detecting false alarms based on the noise power estimate, and further comprising a circuit that updates the noise estimate based on dwell data.

11. The receiver according to claim 10, wherein said circuit for updating the noise estimate comprises a filter set to unity gain.

12. The receiver according to claim 10, wherein said at least one noise estimator and detector is operative for estimating noise on a 2×2 per space-frequency-polarized channel.

13. The receiver according to claim 10, and further comprising a constant false alarm rate (CFAR) detector that detects and filters false alarms based on the detector threshold.

14. The receiver according to claim 10, wherein one subarray is selected for estimating noise.

15. The receiver according to claim 10, wherein each channel output includes a noise estimator and detector.

16. The receiver according to claim 10, wherein at least one noise estimator and detector is distributed at each frequency sub-band.

17. The receiver according to claim 10, and further comprising a plurality of processing and detection layers having at least one noise estimator and detector for scaling a noise level by bandwidth ratios.

18. The receiver according to claim 10, wherein said at least one noise estimator and detector is operative for decomposing a correlation matrix without an eigenvalue computation using quadratic factoring results.

19. The receiver according to claim 10, wherein at least one noise estimator and detector is operative for pooling candidate channels.

20. A method for estimating noise power and establishing a threshold for communications signals received over a communications channel, comprising:

receiving multiple communications signals within an antenna array comprising a plurality of antenna subarrays;

splitting the communications signals into multiple frequency sub-bands per subarray, each having a channel output; and estimating noise power and setting a detector threshold used in detecting false alarms by forming a temporal covariance matrix on each channel output, performing an eigenvalue decomposition on the temporal covariance matrix, selecting candidate channels using the eigenvalue spread per channel, computing a noise power estimate from the candidate channels and setting a detector threshold for detecting false alarms based on the noise power estimate.

21. The method according to claim 20, which further comprises estimating the noise on a 2×2 per space-frequency-polarized channel.

22. The method according to claim 20, which further comprises decomposing a correlation matrix without an eigenvalue computation using quadratic factoring results.

* * * * *